United States Patent
Chen et al.

(10) Patent No.: US 10,320,620 B2
(45) Date of Patent: Jun. 11, 2019

(54) VIRTUAL MODELS FOR ACCESS/CONTROL OF INTERNET OF THINGS (IOTS) DEVICES

(71) Applicant: Verizon Patent and Licensing Inc., Arlington, VA (US)

(72) Inventors: Zhong Chen, Acton, MA (US); Manuel E. Ledesma, Lexington, MA (US); Gang Fu, Shrewsbury, MA (US); Lin Zhu, Lexington, MA (US); Jianxiu Hao, Acton, MA (US)

(73) Assignee: Verizon Patent and Licesing Inc., Basking Ridge, NJ (US)

( * ) Notice: Subject to any disclaimer, the term of this patent is extended or adjusted under 35 U.S.C. 154(b) by 258 days.

(21) Appl. No.: 15/210,986

(22) Filed: Jul. 15, 2016

(65) Prior Publication Data

US 2018/0019929 A1 Jan. 18, 2018

(51) Int. Cl.
*H04L 12/24* (2006.01)
*H04L 12/58* (2006.01)
*G06F 16/22* (2019.01)

(52) U.S. Cl.
CPC ............ *H04L 41/145* (2013.01); *G06F 16/22* (2019.01); *H04L 41/22* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 9,927,784 B2* | 3/2018 | Zave | G05B 15/02 |
| 2009/0216999 A1* | 8/2009 | Gebhart | G06F 9/5044 |
| | | | 712/36 |
| 2010/0232290 A1* | 9/2010 | Wong | H04L 41/00 |
| | | | 370/229 |
| 2011/0131305 A1* | 6/2011 | Venzano | H04L 41/082 |
| | | | 709/222 |
| 2017/0097621 A1* | 4/2017 | Ackmann | G05B 19/0426 |
| 2018/0246484 A1* | 8/2018 | Zimmerman | H04L 67/10 |

* cited by examiner

*Primary Examiner* — Joshua Joo

(57) ABSTRACT

A network device enables browsing of a plurality of pre-defined VMs associated with IoT devices. The network device receives, from a user device, selection of a first pre-defined VM from the plurality of pre-defined VMs, wherein the first pre-defined VM includes at least one first device state and at least one first sensor type, and receives, from the user device, instructions to modify the first pre-defined VM, by adding an additional device state or an additional sensor type to the first pre-defined VM or by removing the at least one first device state or the at least one first sensor type from the first pre-defined VM, to create a first customized VM associated with a first physical IoT device. The network device stores the first customized VM in a database, and uses the first customized VM for accessing or controlling the first physical IoT device.

20 Claims, 16 Drawing Sheets

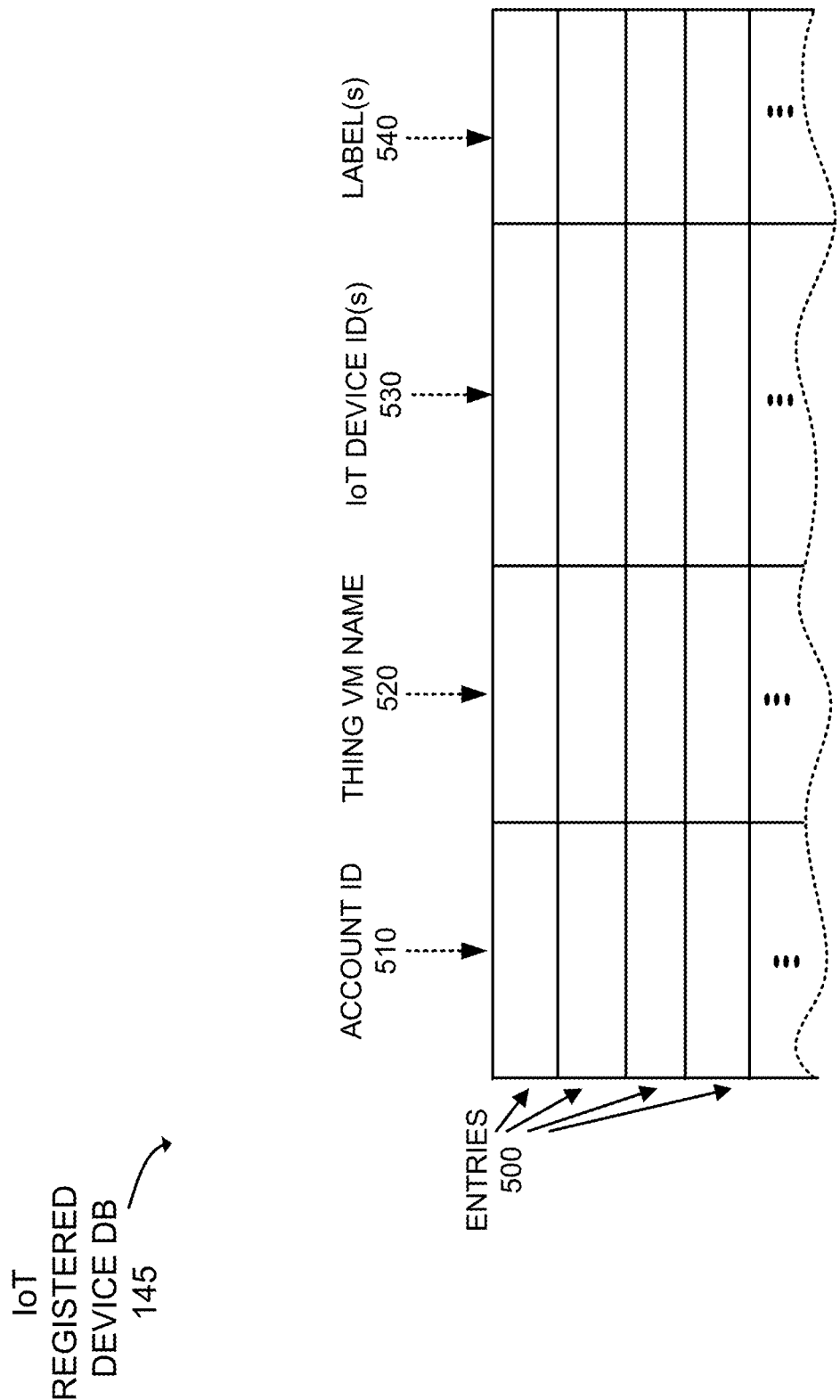

VIRTUAL MODELS FOR ACCESS/CONTROL OF INTERNET OF THINGS (IOTS) DEVICES

BACKGROUND

The "Internet of Things" (IoT) is a network of physical devices (i.e., "things") specially designed for a specific function, unlike general computing devices like desktop or laptop computers. IoT devices are embedded with electronics and network connectivity that enable these devices to collect, store and exchange data. The network connectivity may include, for example, Bluetooth™ connectivity, Wi-Fi connectivity, and/or cellular network connectivity. An IoT device may additionally have computational capability, with various installed software (e.g., apps), and may also include one or more of various types of sensors. An IoT device may be, via the network connectivity, controlled remotely across existing network infrastructure. An IoT device may use the network connectivity to communicate with other IoT devices, or with certain nodes (e.g., a particular server or computer) across the Internet.

BRIEF DESCRIPTION OF THE DRAWINGS

FIG. 5 is a diagram that depicts an exemplary implementation of the IoT registered device database of FIG. 2;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use virtual models (VMs) to abstract the behavior of physical IoT devices and to provide a unified way to access and/or control the IoT devices. Through the use of VMs, heterogeneous physical IoT devices are normalized under well defined VMs such that user device applications are able to interact with the IoT devices in a normalized way regardless of the Original Equipment Manufacturer's (OEM's) hardware implementation. Through the use of VMs for IoT device access and control, customized VMs may be created that enable new and different types of physical IoT devices, having different types of functionality, to be accessed and controlled via the customized VMs. A thingspace platform may provide network functionality for user devices to create customized VMs and store those VMs in a database for future use. The pre-defined VMs used herein may include generic VMs for certain types of IoT devices, or for well-known vendor models, in addition to customized VMs created by different users for their particular IoT device(s).

Figure 1A:
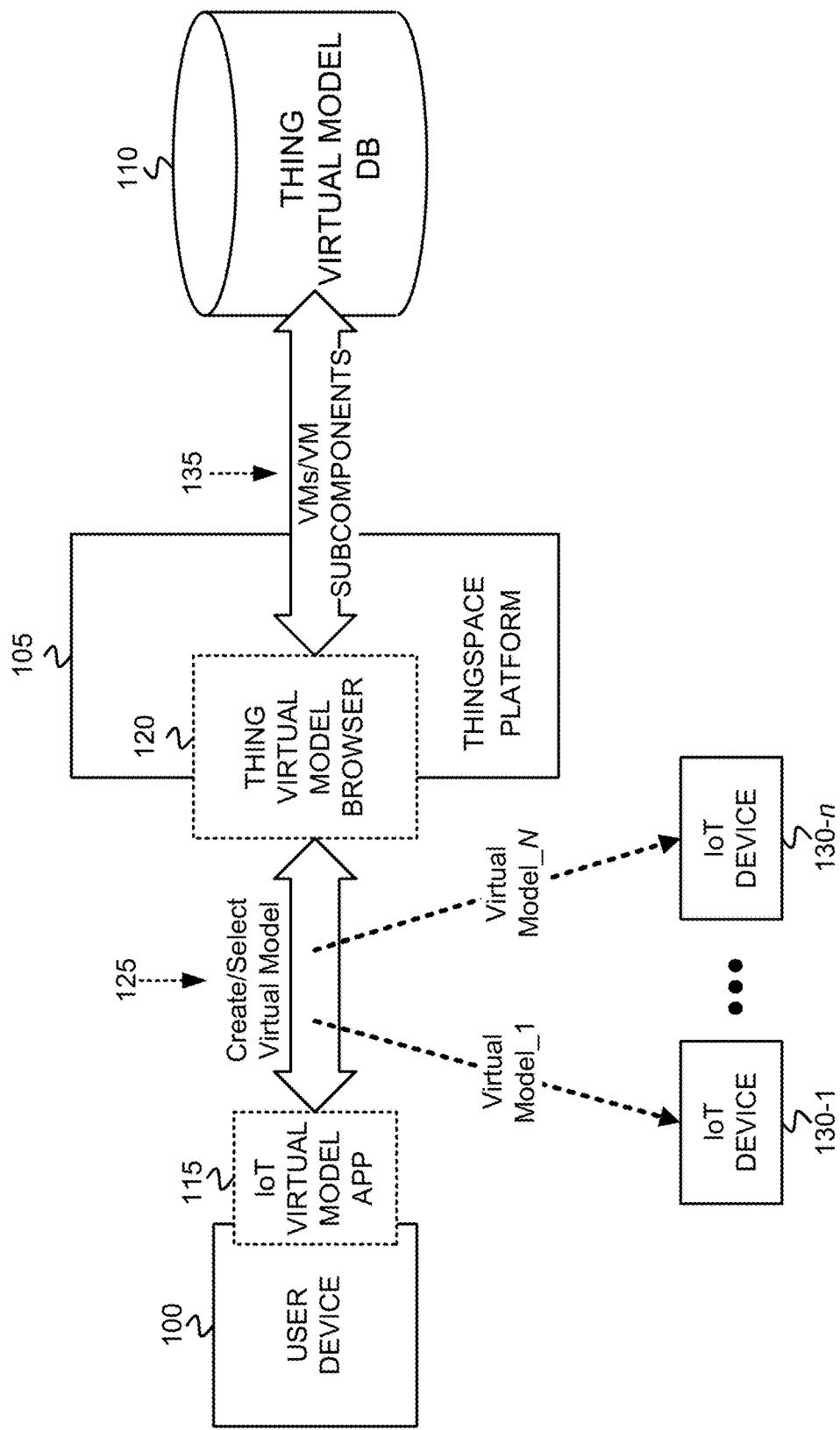
FIGS. 1A and 1B illustrate an exemplary overview of the creation, and use of, thing virtual models for accessing and controlling physical IoT devices in a network environment.
Figure 1B:
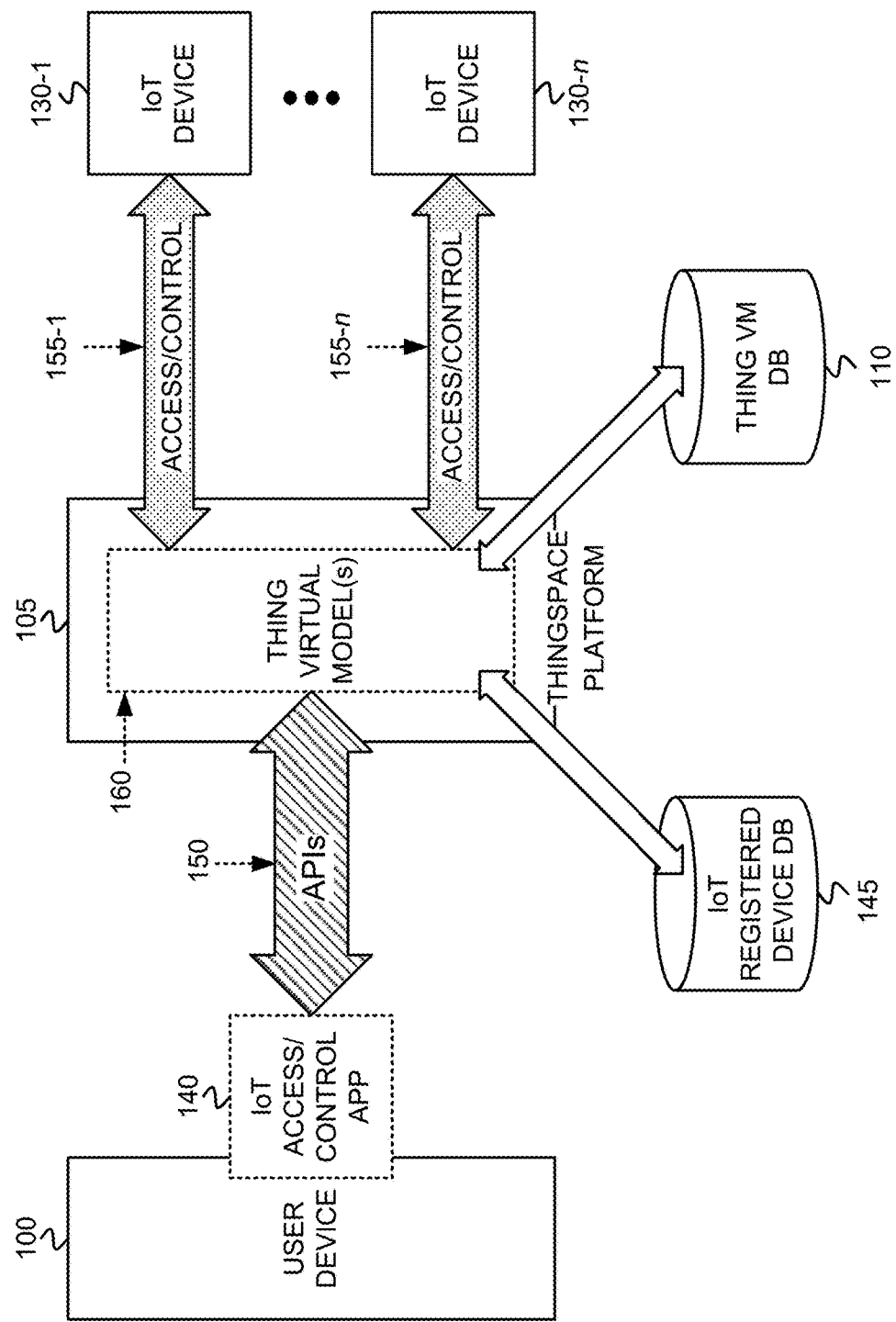

FIGS. 1A and 1B illustrate an exemplary overview of the creation, and use of, Thing Virtual Models (VMs) for accessing and controlling physical IoT devices in a network environment. FIG. 1A depicts a user device 100 creating and/or selecting a VM, via a thingspace platform 105, for a particular physical IoT device for storing in a thing VM database (DB) 110. The physical IoT device(s) may also be registered, in IoT Registered device DB 145, in association with the selected/created VM. Subsequent to storage in thing VM DB 110, the created/selected VMs may be used for accessing and controlling one or more IoT devices.

As shown in FIG. 1A, a user device 100 may execute an IoT virtual model (VM) app 115 to permit a user (not shown) of user device 100 to browse, via a thing VM browser 120, VMs and/or subcomponents of VMs to create and/or select 125 a VM for associating with a particular IoT device of IoT devices 130-1 through 130-n. IoT VM app 105 may include software and/or hardware that enables the user of user device 100 to display, via, for example, a graphical user interface, pre-defined VMs and/or pre-defined subcomponents of VMs for selection by a user of user device 100 to create a customized VM for a particular physical IoT device(s). In one implementation, thing VM browser 120 may include software and/or hardware which interacts with IoT VM app 115 to enable the user of user device 100 to browse a catalog of pre-defined VMs and/or pre-defined components of VMs 135 for selection when creating a customized VM. In another implementation, thing VM browser 120 may include software and/or hardware at user device 100 (e.g., a web browser). The software and/or hardware enables user device 100 to download software and/or documents, from thingspace platform 105, that includes pre-defined VMs and/or pre-defined subcomponents of VMs 135. The downloaded software and/or documents may be used by the user of user device 100 for selecting pre-defined VMs and/or pre-defined subcomponents of VMs for creating a customized VM.

The selected/created VM may include a previously created, pre-defined VM that may be selected, including all of its pre-defined subcomponents, by the user of user device 100 for association with a particular physical IoT device(s). The selected/created VM may also include one or more pre-defined individual subcomponents of VMs that may be selected by the user of user device 100 for creating a customized VM. To enable the user of user device 100 to browse pre-defined VMs and/or pre-defined components of VMs, thingspace platform 105 retrieves VM information, including the pre-defined VMs and pre-defined VM subcomponents 135, from thing VM DB 110 for presentation via user device 100 as a catalog. The user of user device 105 may, via IoT VM app 115 and/or thing VM browser 120, browse through the catalogued VM information to select an appropriate VM, or one or more subcomponents of a VM, to create a custom VM for one or more physical IoT devices.

FIG. 1B illustrates an exemplary overview of the use of thing VMs for accessing and controlling physical IoT devices in a network environment. As shown in FIG. 1B, an IoT access/control app 140, executing at user device 100, may use one or more Application Programming Interfaces (APIs) 150 to send commands to thingspace platform 105 for accessing data at one or more of IoT devices 130-1 through 130-n and/or for controlling some aspect of the operation of one or more of IoT devices 130-1 through 130-n. Thingspace platform 105 may use IoT registered device DB 145 and thing VM DB 110, to retrieve an appropriate thing VM(s) 160 and, based on the commands received via APIs 150 and based on the retrieved thing VM(s) 160, may send access and/or control signaling 155-1 through 155-n to respective ones of IoT devices 130-1 through 130-n. Thingspace platform 105 may return messaging (not shown in FIG. 1B) to user device 100 that includes data accessed at IoT device(s) 130 (e.g., sensor data), and/or data acknowledging control over the aspect of the operation of IoT device(s) 130.

Figure 1C:
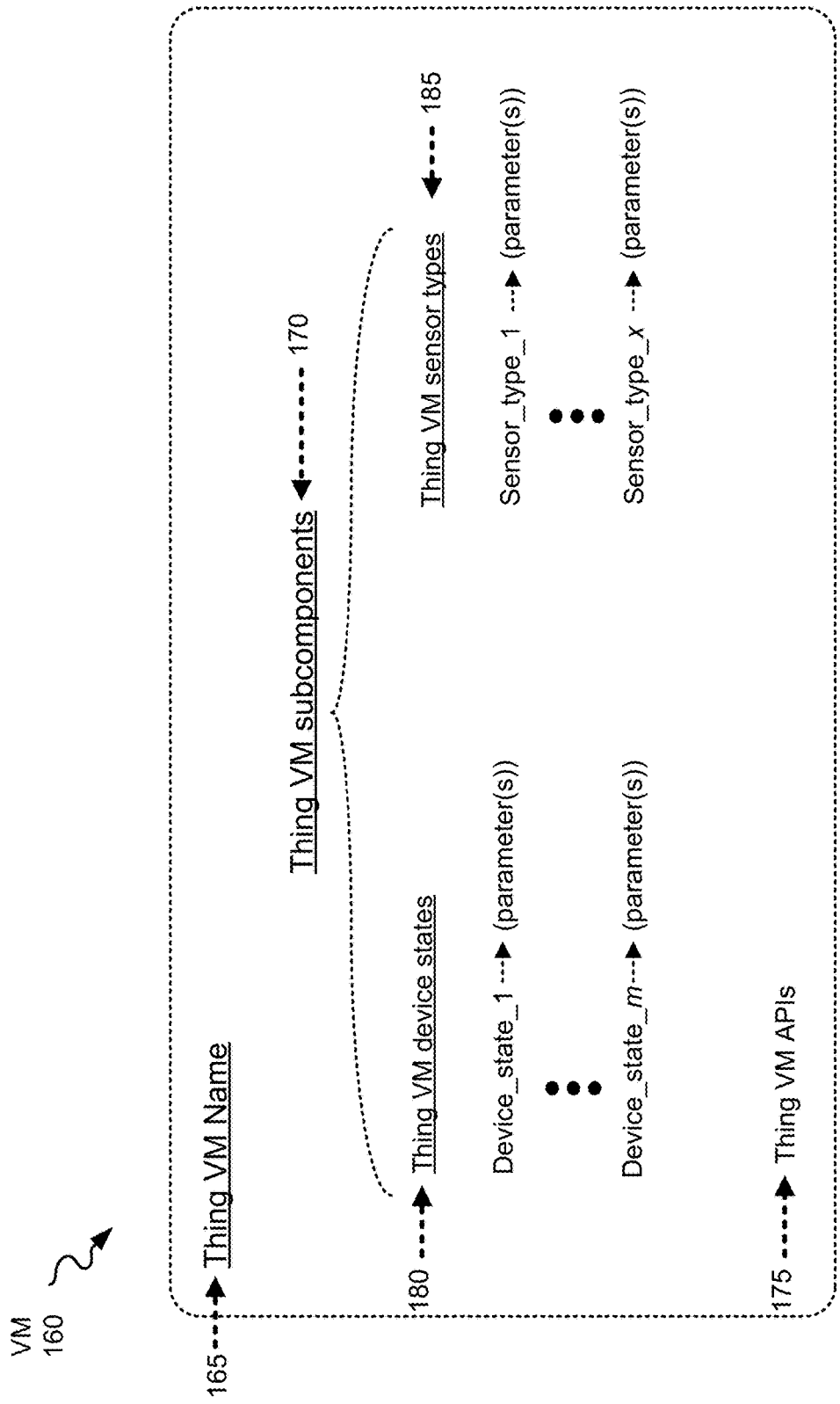
FIG. 1C depicts an exemplary implementation of a thing virtual model.

FIG. 1C depicts an exemplary implementation of thing VM 160. Thing VM 160 may include a thing VM name 165, thing VM subcomponents 170, and thing VM APIs 175. Thing VM name 165 includes a name or identifier that uniquely identifies thing VM 160. The name or identifier may include alphanumeric characters in any combination, and may additionally include various other types of symbols (e.g., *, &, %, or # symbols). Thing VM subcomponents 170 may include data and one or more generalized software mechanisms for accessing and/or controlling a physical IoT device. Thing VM subcomponents 170 include one or more thing VM device states 180, and one or more thing VM sensor types 185.

Thing VM device states 180 include generalized software mechanisms that specify one or more operational states of the physical IoT device with which the thing VM may be associated, where each device state may be defined by one or more parameters that may each have one or more discrete values, or a range of continuous values. The device states may include, for example, a brightness state, a longitude state, an altitude state, a latitude state, a time state, a temperature state, a distance state, etc. For example, an IoT device may be a "smart light" and may have a device state of "brightness." A color parameter (e.g., red, green, blue) and a light intensity parameter (0 to 100, low to high intensity) may be associated with the "brightness" device state. The device states of a thing VM may include any type of state associated with measurements performed by sensors at a physical IoT device, or any type of device state associated with the operation of a physical IoT device.

Thing VM sensor types 185 include data and software mechanisms for specifying the one or more types of sensors of a physical IoT device with which the thing VM may be associated. The data and software mechanisms further specify the parameter(s) to be sensed and/or measured at the type of sensor, and include mechanisms for accessing data associated with the sensed and/or measured parameter(s) and mechanisms for controlling the operation of the one or more types of sensors.

Thing VM APIs 175 may include one or more APIs associated with implementing the thing VM to access data at, and/or control the operation of, a physical IoT device associated with the particular thing VM. For example, the one or more APIs may include APIs for specifying parameters of device states of the thing VM. As another example, the one or more APIs may include APIs for requesting measured data from sensors associated with the sensor types of the thing VM 160.

Figure 2:
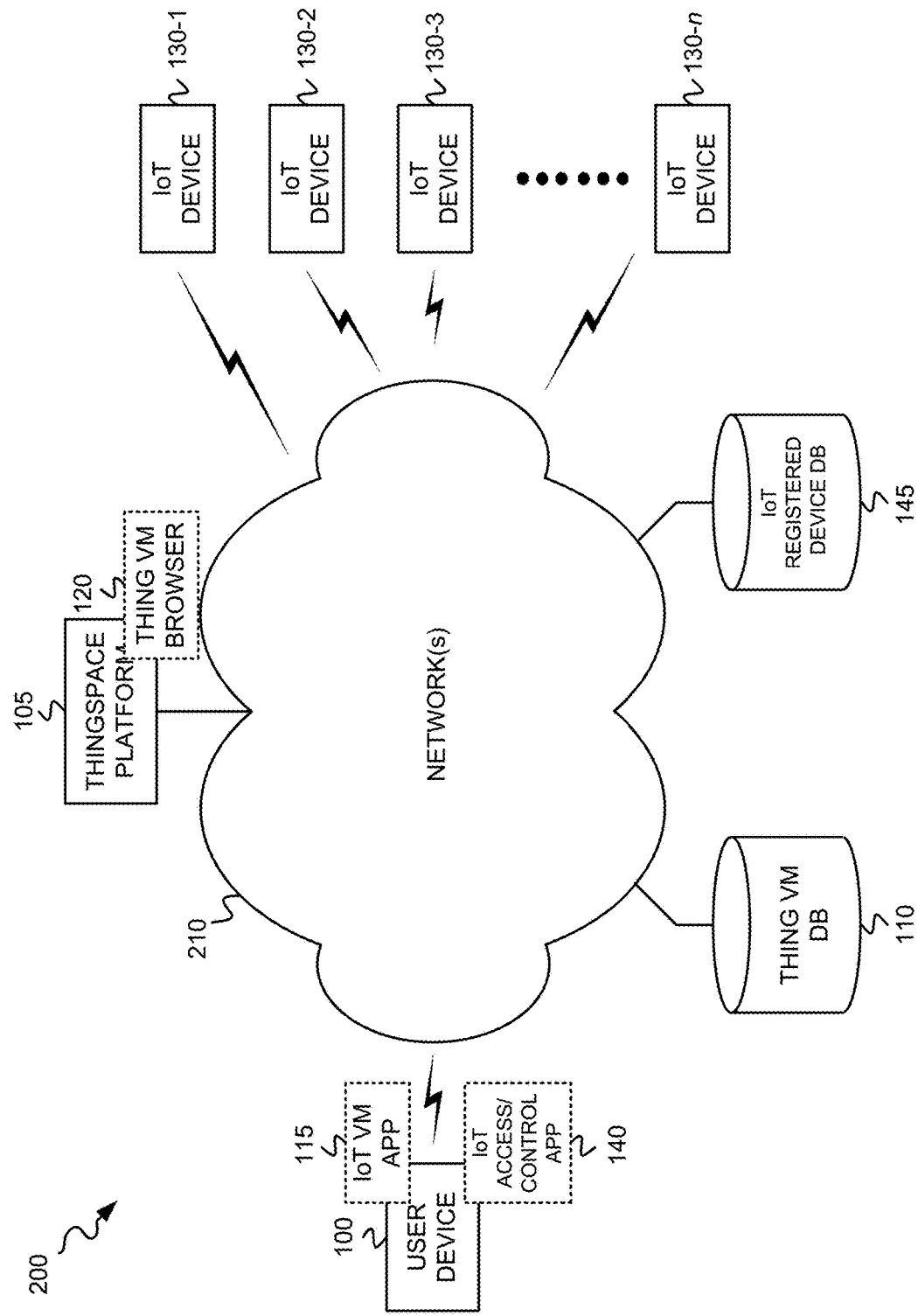
FIG. 2 illustrates an exemplary network environment in which thing virtual models are created, and subsequently used for accessing and controlling physical IoT devices.

FIG. 2 illustrates an exemplary network environment 200 in which thing VMs are created, and subsequently used for accessing and controlling physical IoT devices. Network environment 200 may include user device 100, thingspace platform 105, thing VM DB 110, IoT devices 130-1 through 130-n, IoT registered device DB 145, and network(s) 210.

User device 100 includes an electronic device that further includes a communication interface (e.g., wired or wireless) for communicating via network(s) 210. User device 100 may include, for example, a cellular radiotelephone; a smart phone; a personal digital assistant (PDA); a wearable computer; a desktop, laptop, palmtop or tablet computer; or a media player. User device 100 may, however, include any type of electronic device that includes a communication interface for communicating via network(s) 210. A "user" (not shown in FIG. 2) may be associated with user device 100, where the user may be an owner, operator, and/or a permanent or temporary user of user device 100. As shown, user device 100 may execute IoT VM app 115 and/or IoT access/control app 140, described above with respect to FIGS. 1A and 1B.

Thingspace platform 105 includes one or more network devices that enable user device 100 to select/create a VM for one or more of IoT devices 130-1 through 130-n, to register the one or more of IoT devices 130-1 through 130-n in IoT registered device DB 145, and to store the selected/created VM in thing VM DB 110 for future retrieval and use in accessing/controlling the one or more registered IoT devices 130-1 through 130-n.

Thing VM DB 110 includes one or more network devices that store a data structure(s) that enables the storage and retrieval of VMs for associating with and/or registering with one or more physical IoT devices and for accessing data at, or controlling the operation of, the one or more physical IoT devices via use of the VMs. Thing VM DB 110 may additionally store one or more APIs for use in accessing data at, or controlling the operation of, the one or more physical IoT devices.

IoT devices 130-1 through 130-n (generically referred to herein as "IoT device 130" or "IoT devices 130") each include a physical object or device (i.e., a "thing") that may be designed for a specific function and which may be embedded with electronics, memory storage, and network connectivity that enables these objects or devices to collect, store and exchange data with other IoT devices or with certain network nodes. Each device 130's network connectivity may include, for example, Bluetooth™ connectivity, Wi-Fi connectivity, and/or cellular network connectivity.

IoT registered device DB 145 includes one or more network devices that store a data structure(s) that enables the storage and retrieval of account information for a particular user of a user device 100, including an account identifier (ID), information for uniquely identifying one or more IoT devices, and a name of the VM to be used for accessing and/or controlling the identified one or more IoT devices.

Network(s) 210 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network). In one implementation, network(s) 210 may include a PLMN or satellite mobile network connected to the Internet. In another implementation, network(s) 210 may include a fixed network (e.g., an optical cable network) connected to the Internet.

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2. For example, though a single user device 100 is depicted in FIG. 2, multiple different user devices 100 may connect to network(s) 210, with each of the user devices 100 possibly being associated with a different user.

Figure 3:
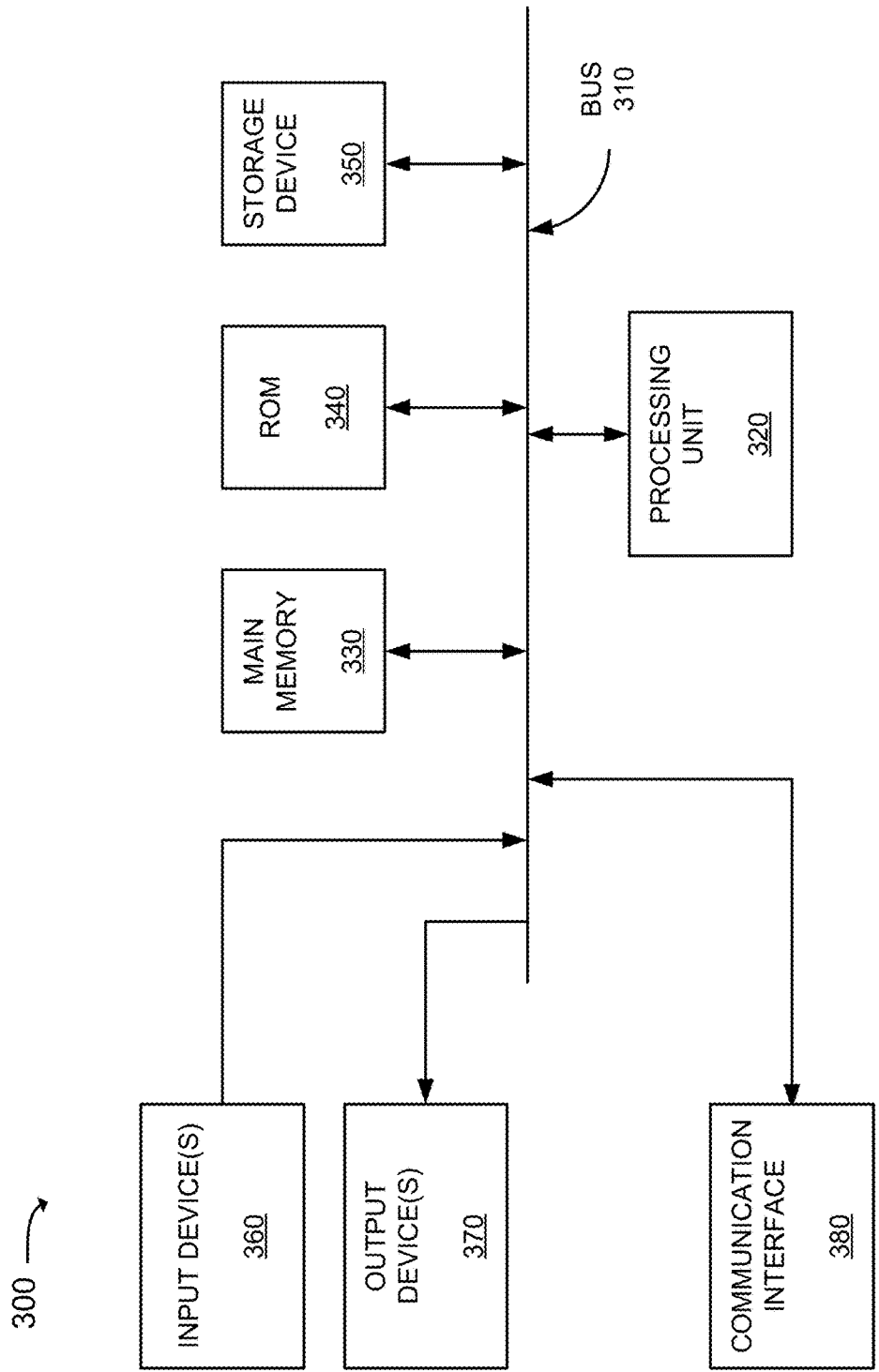
FIG. 3 is a diagram that depicts exemplary components of a computational device that may correspond to the user device, thingspace platform, thing virtual model database, and IoT registered device database of FIG. 2.

FIG. 3 is a diagram that depicts exemplary components of a computational device 300 (referred to herein as "device 300"). User device 100, thingspace platform 105, IoT device 130, thing VM DB 110, and IoT registered device DB 145 may each be configured similarly to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 may include a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display, a speaker, etc. Input device 360 and output device 370 may, in some implementations, be implemented as a graphical user interface (GUI) that displays GUI information and which receives user input via the GUI. In an instance where device 300 is user device 100, the GUI of input device 360 and output device 370 may include a touch screen GUI that uses any type of touch screen device. Communication interface(s) 380 may include a transceiver that enables device 300 to communicate with other devices and/or systems. For example, communication interface(s) 380 may include wired and/or wireless transceivers for communicating via network(s) 210.

The configuration of components of device 300 shown in FIG. 3 is for illustrative purposes. Other configurations may be implemented. Therefore, device 300 may include additional, fewer and/or different components, arranged in a different configuration, than depicted in FIG. 3. For example, an IoT device 130 may include similar components to those shown in FIG. 3, but may omit input device(s) 360, output device(s) 370, and storage device 350.

Figure 4:
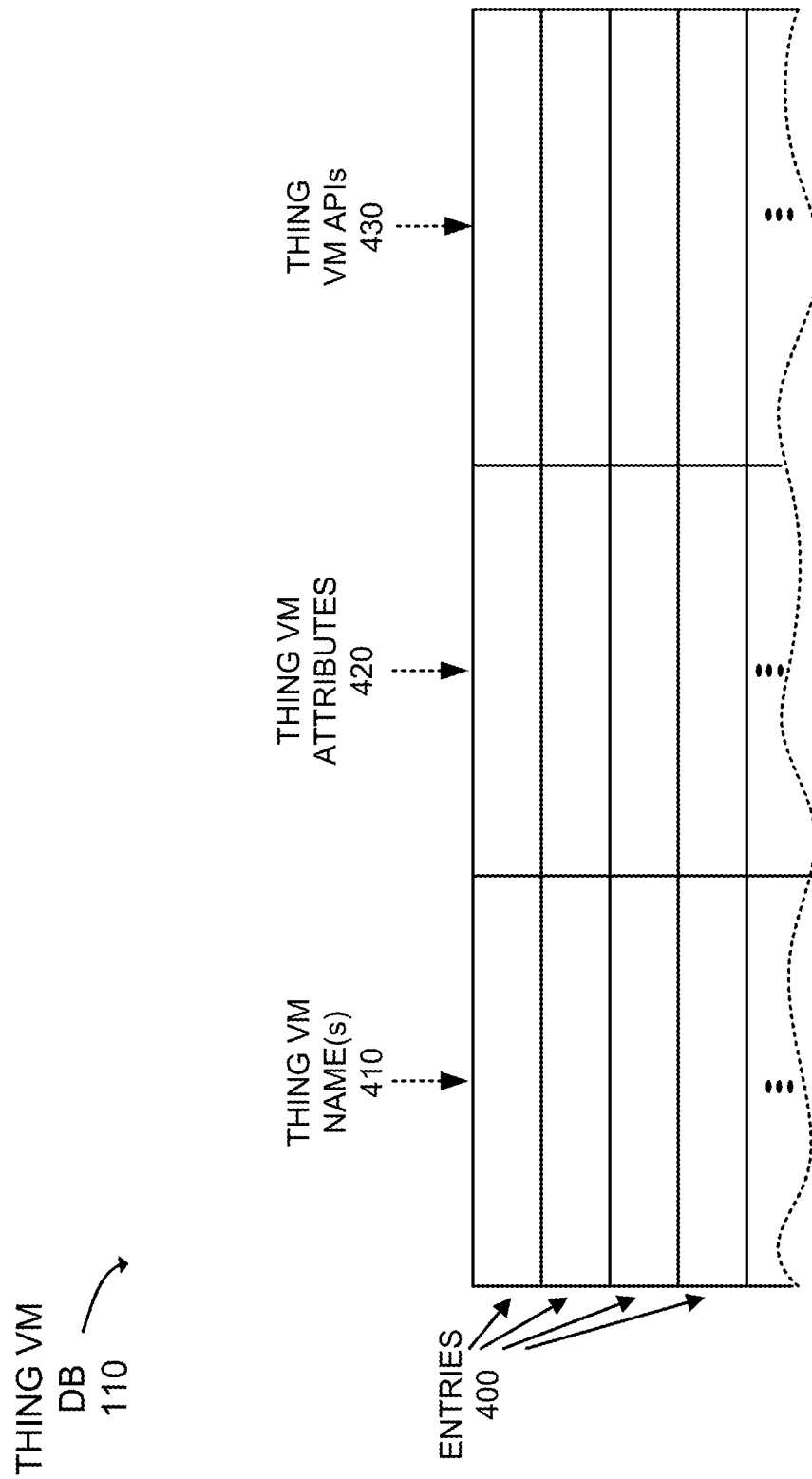
FIG. 4 is a diagram that depicts an exemplary implementation of the thing virtual model database of FIG. 2.

FIG. 4 is a diagram that depicts an exemplary implementation of thing VM DB 110. As shown, a data structure of DB 110 may include multiple entries 400, with each entry 400 including a thing VM name(s) field 410, a thing VM attributes field 420, and a thing VM APIs field 430.

Thing VM name(s) field 410 stores a unique name identifier associated with a particular thing VM. Thing VM attributes field 420 stores attributes of a particular thing VM including, among other data, information that specifies one or more subcomponents of the thing VM. For example, the subcomponents may include one or more device states and one or more sensor types. Thing VM APIs field 430 stores one or more APIs, for a particular VM, for use by a user device 100 in accessing data at an IoT device(s) and/or controlling the operation of the IoT device(s).

To locate a particular entry of thing VM DB 110, DB 110 may be indexed with, for example, a thing VM name to locate an entry 400 having a matching thing VM name stored in field 410. When such an entry 400 is located, data may be stored in one or more fields 420 and/or 430 of the entry 400, or data may be retrieved from one or more fields 420 and/or 430 of the entry 400. Other fields of an entry 400, instead of thing VM name(s) field 410, may be used for indexing DB 110.

FIG. 5 is a diagram that depicts an exemplary implementation of IoT Registered Device DB 145. As shown, a data structure of DB 145 may include multiple entries 500, with each entry 500 including an account ID field 510, a thing VM name field 520, an IoT device ID(s) field 530, and a label(s) field 540.

Account ID field 510 stores a unique account identifier associated with a particular user. The unique account identifier may, for example, include the mobile telephone number of the particular user. Any type of unique ID, however, may be used for identifying the user account. Thing VM name field 520 stores an identifier of the particular VM to be associated with the IoT devices identified in field 530. The VM name identifier may be alphabetic, numeric, alphanumeric, or symbolic, or any combination of such identifiers. The VM name stored in field 520 corresponds to a VM, with a matching VM name stored in field 410 of thing VB DB 110.

IoT device ID(s) field 520 stores unique identifiers of each physical IoT device that is associated, in entry 500, with the account ID and the identified VM. In one implementation, each unique identifier may include a network address (e.g., Internet Protocol (IP) address) associated with a particular physical IoT device. Label(s) field 530 stores a label for identifying the combination of the account ID in field 510, the thing VM name in field 520, and the IoT devices identified in field 530. The label stored in field 530, thus, represents a type of "short hand" identifier for an identified group of IoT devices affiliated with a particular account, and associated with a particular VM that is used for accessing and/or controlling the devices of the group of IoT devices.

To locate a particular entry of thing IoT registered device DB 145, DB 145 may be indexed with, for example, an IoT device ID to locate an entry 500 having a matching IoT device ID stored in field 530. When such an entry 500 is located, data may be stored in one or more fields 510, 520, 530 and/or 540 of the entry 500, or data may be retrieved from one or more fields 510, 520, 530 and/or 540 of the entry 500. Other fields of an entry 500, instead of thing IoT device ID(s) field 530, may be used for indexing DB 145.

VM DB 110 and IoT registered device DB 145 are depicted in FIGS. 4 and 5 as including tabular data structures with certain numbers of fields having certain content. The tabular data structures of DBs 110 and 145 shown in FIGS. 4 and 5, however, are for illustrative purposes. Other types of data structures may alternatively be used. The number, types, and content of the entries and/or fields in the data structures of DBs 110 and 145 illustrated in FIGS. 4 and 5 are also for illustrative purposes. Other data structures having different numbers of, types of and/or content of, the entries and/or the fields may be implemented. Therefore, VM DB 110 and IoT registered device DB 145 may include additional, fewer and/or different entries and/or fields than those depicted in FIGS. 4 and 5. In one implementation, use of thing VMs stored in thing VM DB 110 may be restricted to the owner of the account ID that originally created the thing VMs and registered it in IoT registered device DB 145. In other implementations, the owner of the account ID may, at the time of creation of a particular VM, permit the VM to be "published" and made publicly available to other users in a global context. Such publicly available VMs may be, based on a user scoring system as to the quality of each of the VMs, promoted (i.e., ranked higher than other VMs within a ranked list) within a catalog of VMs provided to a user selecting and/or creating a VM for association with one or more physical IoT devices. Once a given VM is allowed by its creator to be globally published, the creator may no longer be able to edit the VM.

Figure 6A:
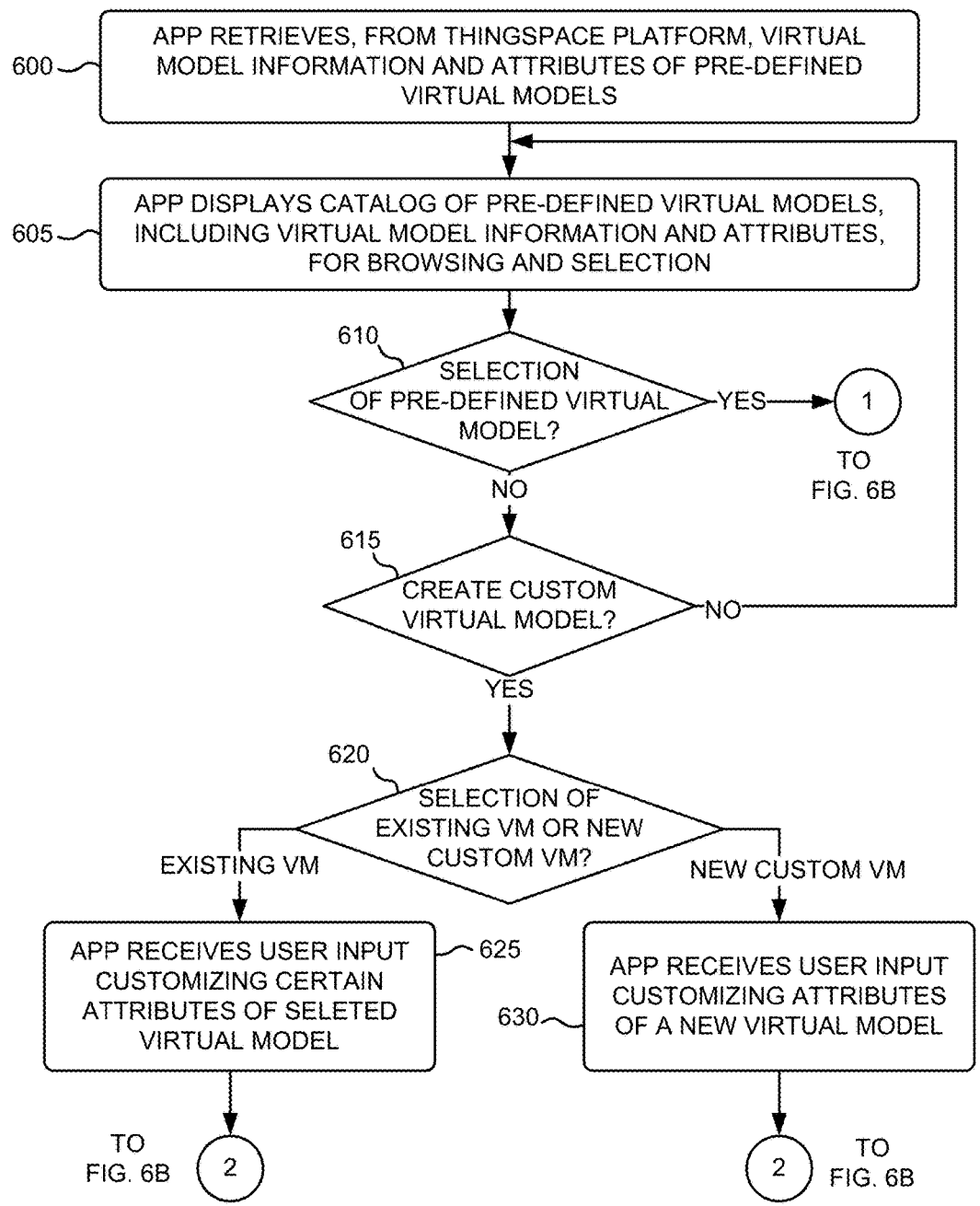
FIGS. 6A and 6B are flow diagrams that illustrate an exemplary process for selecting and/or creating a thing virtual model for association with one or more physical IoT devices and for registering the one or more physical IoT devices in conjunction with the selected/created thing virtual model.
Figure 6B:
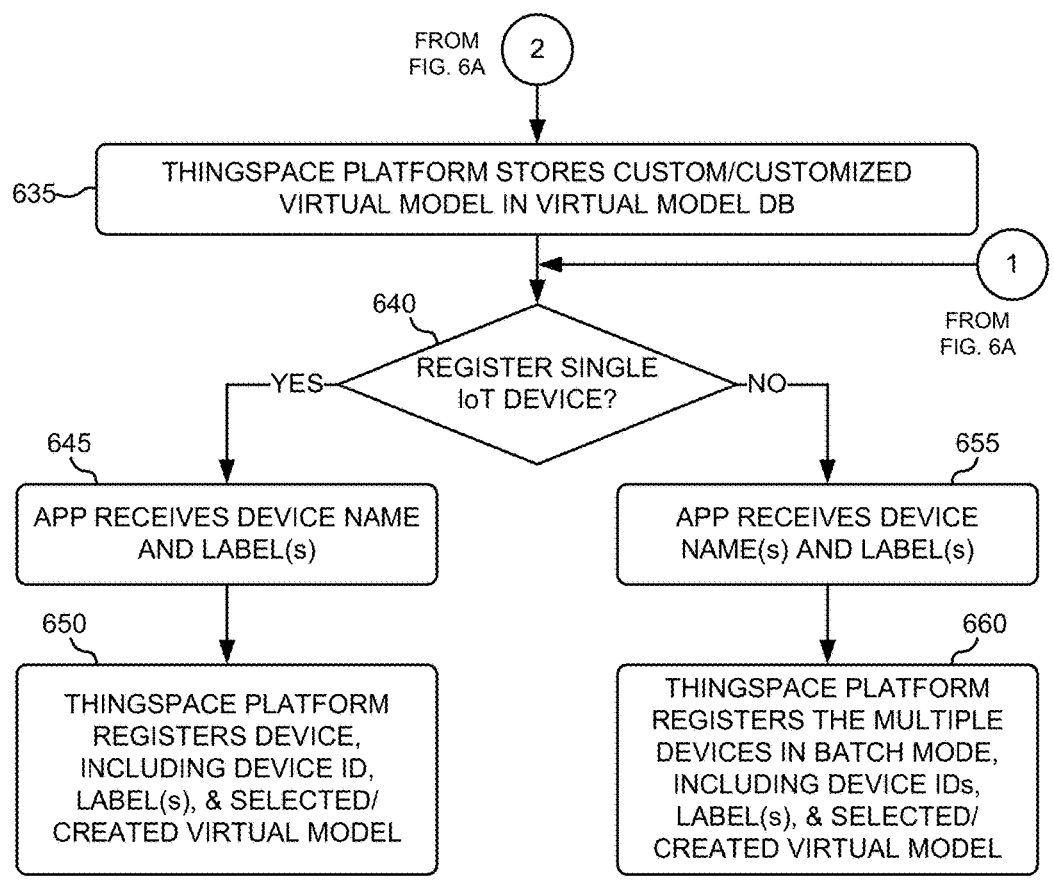

FIGS. 6A and 6B are flow diagrams that illustrate an exemplary process for selecting and/or creating a thing VM for association with one or more physical IoT devices, and for registering the one or more physical IoT devices in conjunction with the selected/created thing VM. The exemplary process of FIGS. 6A and 6B may be implemented by user device 100, in conjunction with thingspace platform 105, thing VM DB 110, and IoT registered device DB 145.

Figure 7:
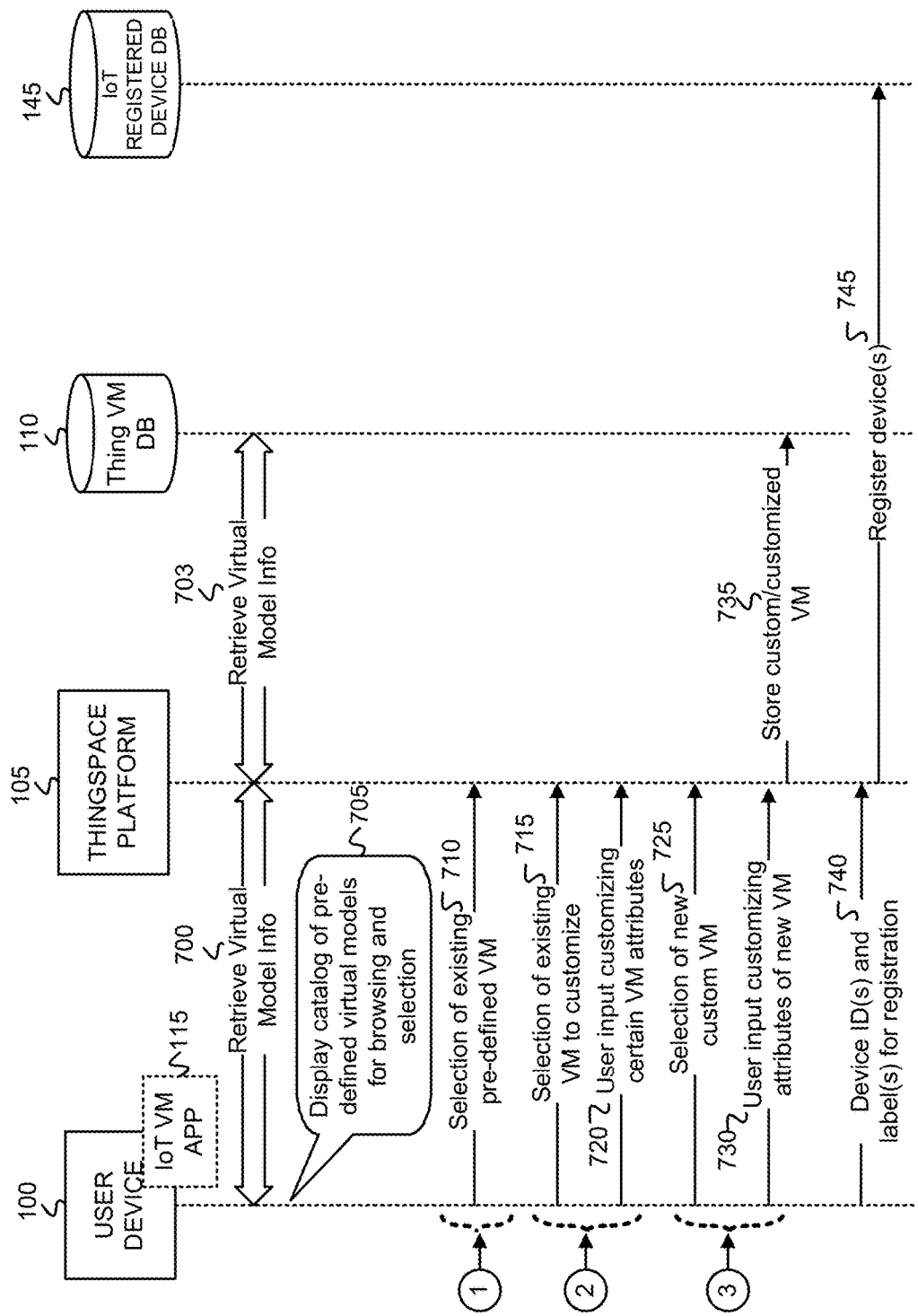
FIG. 7 is an exemplary messaging diagram associated with the process of FIGS. 6A and 6B.

The exemplary process includes IoT VM app 115 retrieving, from thingspace platform 105, virtual model information and attributes of pre-defined virtual models (block 600). IoT VM app 115 requests VM information from thingspace platform 105 which, in turn, retrieves pre-defined VM information from thing VM DB 110. For example, thingspace platform 105 may retrieve the contents of fields 410 and 420 for each entry 400 of DB 110 that is considered to be publicly available (i.e., globally available to all users), and format the retrieved DB contents into an easily viewable/readable VM catalog document. FIG. 7 depicts IoT VM app 115 of user device 100 retrieving 700 VM information from thingspace platform 105, and thingspace platform further retrieving 703 the requested VM information from thing VM DB 110. Thingspace platform 105 returns the requested VM information to IoT VM app 115 at user device 100.

Figure 13:
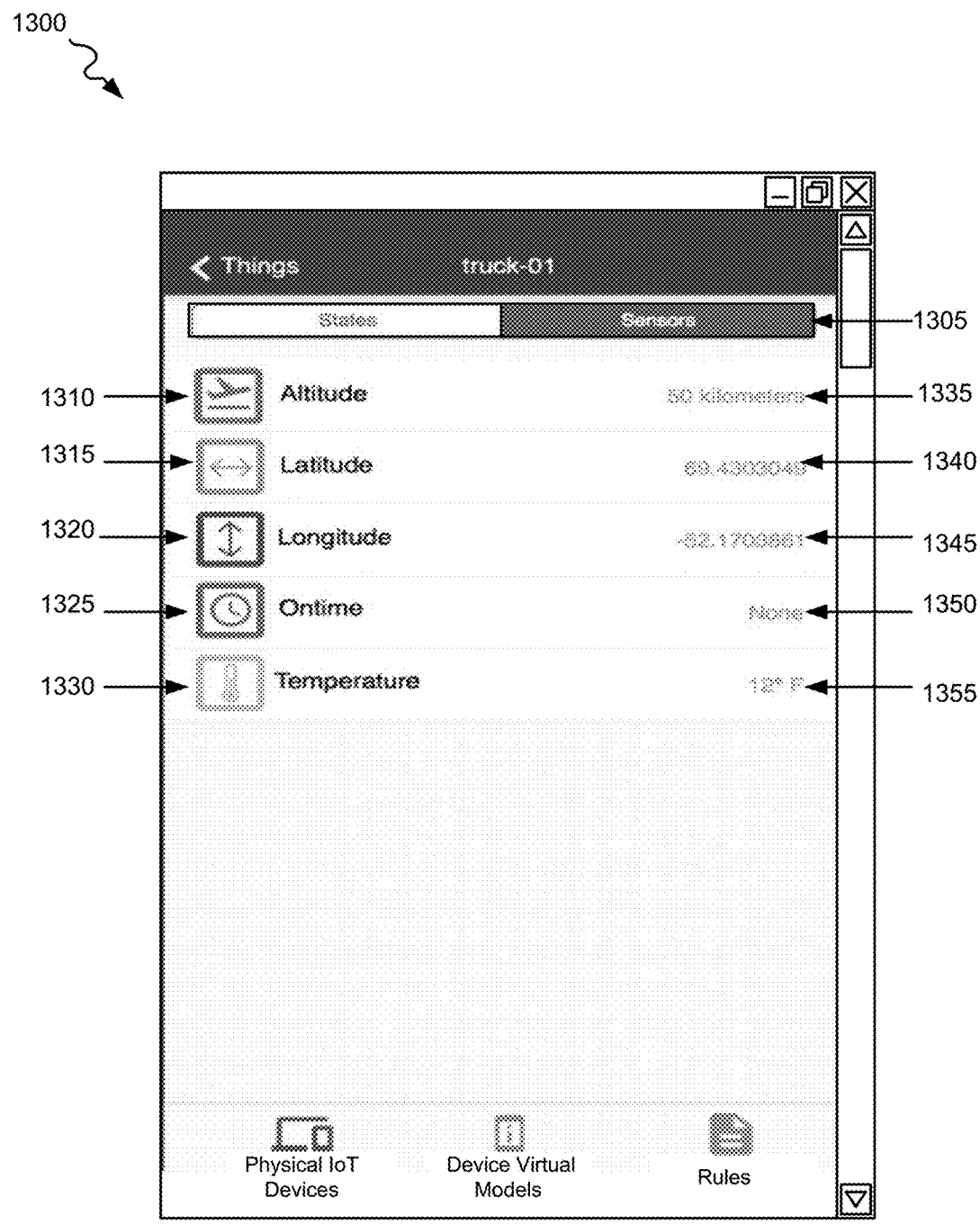
FIG. 13 is a diagram depicting an exemplary user interface for accessing sensor parameters of sensor types associated with a thing virtual model of a particular physical IoT device(s).

App 115 displays a catalog of pre-defined virtual models, including virtual model information and attributes, for browsing and selection (block 605). IoT VM app 115 receives the formatted VM catalog document from thingspace platform 105, and displays the catalog document via a display of user device 100. The catalog of pre-defined virtual models may include those VMs permitted to be "published" and available in a global context for use by all users. Based on a scoring system related to the quality and/or popularity of each published VM, the VMs, within the catalog document, may be ranked relative to one another, with an indication of quality and/or popularity being associated with each VM within the catalog. In one implementation, the VM catalog document may be displayed via a graphical user interface (GUI) at user device 100, such as, for example, via a touch screen GUI. FIG. 13 depicts IoT VM app 115 displaying 705 a catalog of pre-defined VMs for browsing and selection.

Figure 8:
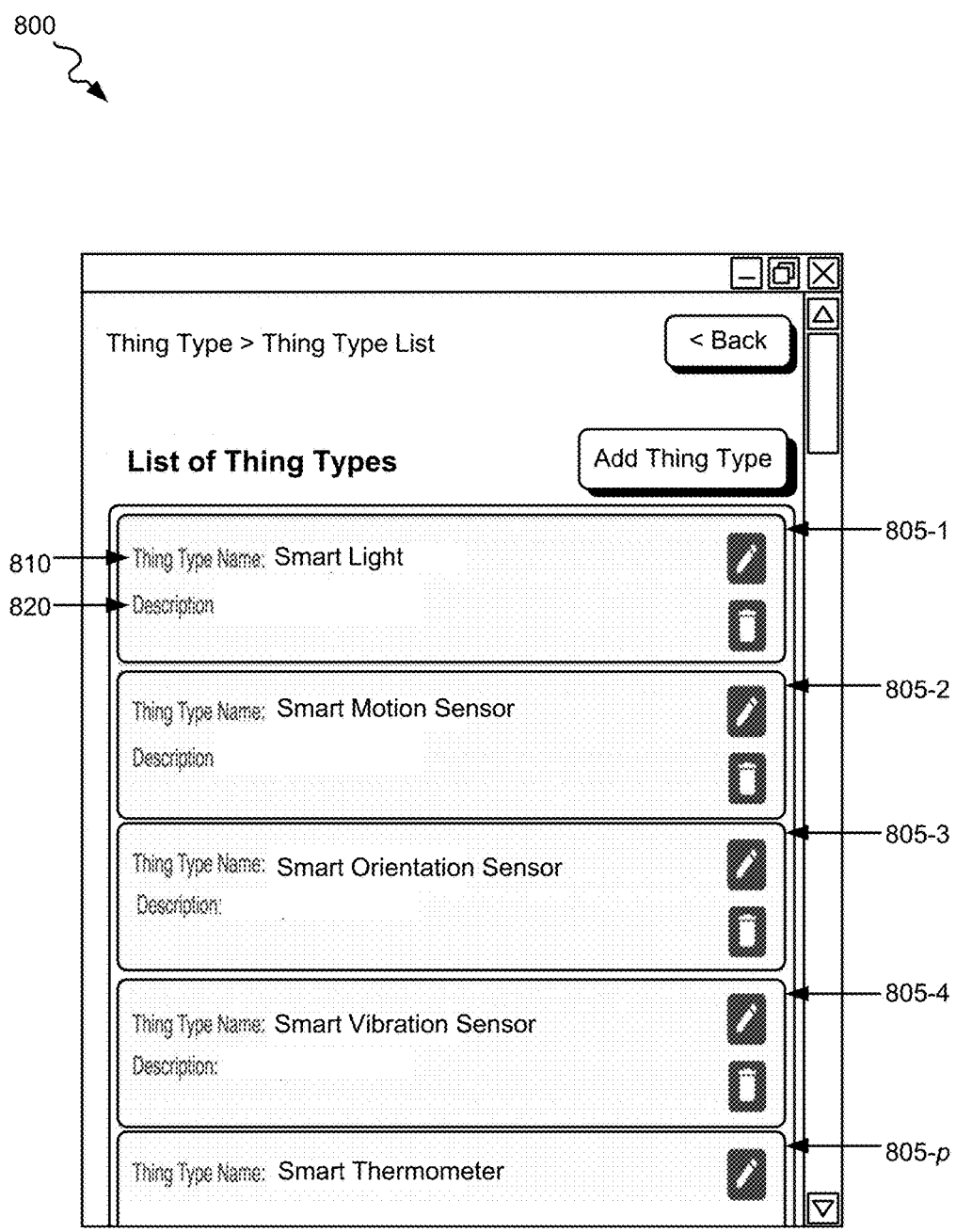
FIG. 8 is a diagram depicting an exemplary user interface for selecting/creating a virtual model for one or more physical IoT devices.

FIG. 8 illustrates one example of a touch screen GUI 800 that enables the user of user device 100 to select a pre-defined thing VM type from a list of thing VM types. As shown, GUI 800 may display a scrollable list containing multiple different pre-defined thing VM types 805-1 through 805-p (where p is a positive integer greater than one). Each displayed thing VM type may include a VM name 810 and a thing VM description 820. The thing VM description 820 may contain (not shown) at least a brief description of the functionality of the thing type, and the attributes and/or parameters associated with the thing VM type. The thing VM types may include, but are not limited to, a smart light, a smart camera, a smart thermometer, a smart altimeter, a smart geo-location device, a clock (i.e., timer), a smart humidity sensor, a smart water sensor, a smart door sensor, a smart window sensor, a smart power usage sensor, a smart window shade sensor, a smart door lock sensor, a smart sound sensor, a smart smoke sensor, a smart light sensor, a smart sprinkler system, a smart contact sensor, a smart water usage sensor, a smart toothbrush usage sensor, a smart orientation sensor, a smart presence sensor, a smart vibration sensor, and a smart earthquake sensor. The thing VM types, however, may include a VM associated with any type of IoT device having any type of functionality.

The attributes may include one or more sensor types associated with the thing VM type, and one or more device states associated with the thing VM type. The one or more sensor types may include, but are not limited to, a thermometer, an altimeter, a geo-location device, a humidity sensor, a water sensor, a door sensor, a window sensor, a power usage sensor, a window shade sensor, a door lock sensor, a sound sensor, a smoke sensor, a light sensor, a motion sensor, a water usage sensor, an orientation sensor, a physical presence sensor, a vibration sensor, and an earthquake sensor. The one or more device states associated with the thing VM type may include, but are not limited to, a light brightness level, a latitude, a longitude, a color, and a distance-traveled alarm. The device states, however, may include any type of device state associated with any type of IoT device, including any type of monitorable and/or controllable device state of an IoT device.

App 115 determines if a selection of a virtual model from the displayed catalog has occurred (block 610). Referring to the example of FIG. 8, the user of user device 100 may select (e.g., touch) a specific pre-defined thing VM type 805 from the catalog of VM types displayed at user device 100. As a specific example, the user of user device 100 may select "smart motion sensor" VM thing type 805-2 from GUI 800 of user device 100. As another specific example, the user of user device 100 may select "smart vibration sensor" VM type 805-4 from GUI 800 of user device 100. FIG. 7 depicts three different exemplary methods of selecting/creating a customized VM for association with one or more physical IoT devices. In the first method (identified with a "1" within a circle), the user of user device 100 selects 710 an existing, pre-defined VM to be associated with the one or more IoT devices, and used "as is" (i.e., with no user modifications of the selected, pre-defined VM). In the second method (identified with a "2" within a circle), the user of user device 100 selects an existing, pre-defined VM, but then modifies the VM to add, or eliminate, one or more subcomponents or attributes to the VM. In the third method (identified with a "3" within a circle), the user of user device 100 selects one or more pre-defined subcomponents of a VM to create a new, custom VM. For example, the user of user device 100 may select one or more pre-defined device states and/or one or more pre-defined sensor types to compose a new, custom VM. If the user of user device 100 selects an existing, pre-defined VM for use in its entirety, or for modification, to create a VM for one or more physical IoT devices, the created VM would inherit all subcomponents of the selected parent VM, including all device states and sensors, via single inheritance.

If there has been a selection of a pre-defined virtual model (YES—block 610), the exemplary process continues at block 640 with registration of one or more IoT devices to be associated with the selected pre-defined VM. FIG. 7 depicts IoT VM app 115 at user device 100 sending 740 the device name(s) and label(s) for registration to thingspace platform 105, and thingspace platform 105 registering 745 the device(s) in IoT registered device DB 145.

If a pre-defined VM is not selected (NO—block 610), the app 115 determines if the creation of a custom virtual model is selected (block 615). If not (NO—block 615), then the exemplary process may return to block 605. If the creation of a custom virtual model is selected (YES—block 615), then app 115 determines if the custom virtual model is to be created based on an existing VM, or based on an entirely new custom VM (block 620). If the custom virtual model is to be created based on an existing VM ("EXISTING VM"—block 620), then app 115 receives user input customizing one or more certain attributes of the selected, existing virtual model (block 625). Customizing one or more attributes of the selected, existing virtual model may include adding one or more selected device states and/or sensor types, and/or may include deleting one or more selected device states and/or sensor types that were initially subcomponents of the existing virtual model. FIG. 7 depicts IoT VM app 115 sending a selection 715, of an existing VM to customize, to thingspace platform 105, and IoT VM app 115 sending user input 720 that customizes certain attributes of the selected VM.

Figure 9:
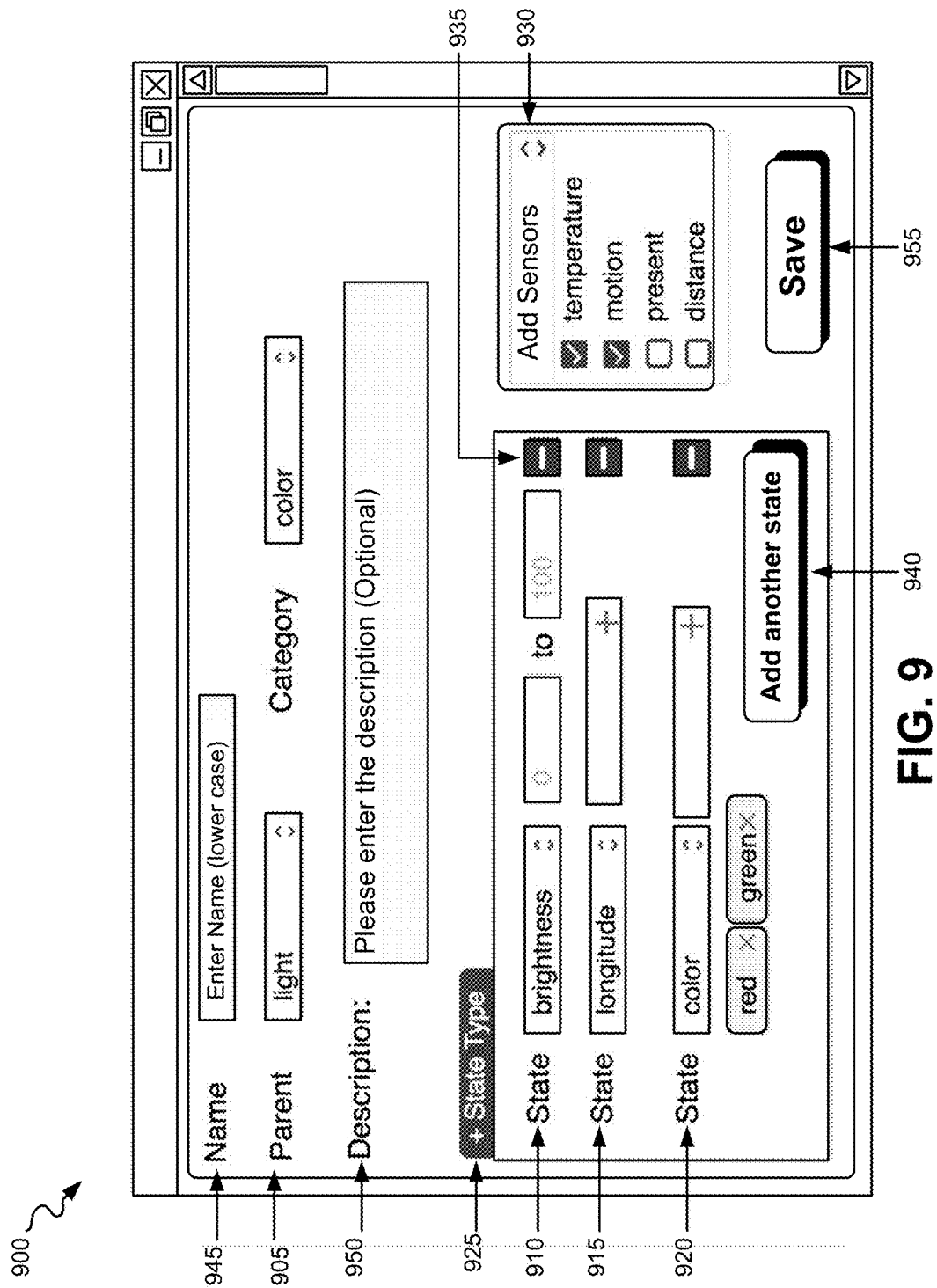
FIG. 9 is a diagram depicting an exemplary user interface for customizing one or more attributes of a thing virtual model.

FIG. 9 depicts an example of a GUI 900 displayed at user device 100 for customizing a selected, pre-defined virtual model. In FIG. 9, the user of user device 100 selects, in field 905, an existing VM type, which in the particular example shown, is a "light" IoT device. Upon selection of a "light" VM type, the pre-defined device state types of "brightness" 910, longitude 915, and color 920 are presented in a "State Type" section 925 of GUI 900. The pre-defined state types may be deleted from the virtual model by user selection of "deletion boxes" 935. Touching, or "clicking on," a "deletion box" 935 causes a corresponding device state to be deleted from the virtual model. Additional device states may be added to the virtual model via selection of "add another state" button 940. Additionally, upon selection of the "light" VM type, a sensor type section 930 is presented which permits the user to "add sensors" to the virtual model by selecting particular "checkboxes" associated with each type of desired sensor type to be added. In the example shown, "temperature" and "motion" sensor types have been selected in selection 930 for adding to the virtual model. When modifications to the existing, pre-defined VM are completed, the user of user device 100 may enter a custom VM name in "Name" field 945, an optional description of the virtual model in "Description" field 950, and may then select the "Save" button 955 to cause the customized VM to be stored in thing VM DB 110.

If the custom virtual model is to be created based entirely on a new, custom virtual model ("NEW CUSTOM VM"—block 620), then app 115 receives user input that customizes attributes of a new virtual model (block 630). For example, a GUI, similar to that shown in FIG. 8, may be presented to the user of user device 100, with the list instead including a list of pre-defined VM subcomponents, such as, for example, a comprehensive list of different device states and/or a comprehensive list of different sensor types. The user may select one or more VM subcomponents from the list of pre-defined VM subcomponents to become part of the new, custom VM. For example, if the list includes device states device_state_1 through device_state_x, then one or more of the device states 1 through x may be selected from the list to become part of the new, custom VM. Additionally, if the list includes sensor types sensor_1 through sensor_y, then one or more of the sensor types 1 through y may be selected from the list to become part of the new, custom VM. Additionally, the GUI may enable the user of user device 100 to create entirely new VM subcomponents, such as entirely new device states and/or device sensor types. Creation of the custom VM may, therefore, include selections of one or more pre-defined VM subcomponents, and/or creation of one or more new VM subcomponents.

App 115 stores the custom/customized virtual model in thing VM DB 110 (block 635). Thingspace platform 105 may store the name of the VM in thing VM name(s) field 410, the custom/customized attributes in thing VM attributes 420, and appropriate APIs for the VM in thing VM APIs field 430 of an entry of thing VM DB 110. FIG. 7 depicts thingspace platform 105 storing 735 the custom/customized VM in thing VM DB 110.

App 115 determines whether a single IoT device is to be registered in association with the custom/customized virtual model (block 640). The user of user device 100 may, via a user interface of user device 100, enter one or more device IDs for the IoT devices which the user desires to register in association with the custom/customized VM selected/created by the user. In one implementation, each of the device IDs for the IoT devices may include a network address (e.g., IP address) for a respective IoT device. If a single IoT device ID is entered by the user, then only a single IoT device is to be registered in association with the custom/customized VM. If multiple IoT device IDs are entered by the user, then the multiple different device IDs are to be registered in association with the custom/customized VM.

If a single IoT device is to be registered (YES—block 640), the app 115 receives a device ID and label(s) (block 645). The user of user device 100 may enter, via a user interface of device 100, a device ID and at least one label(s) for the IoT device. App 115 registers the IoT device, including the device ID, label(s), and the selected/created virtual model (block 650). To register the IoT device, app 115 of device 100 may store the device ID in field 520, the label(s) in field 530, and the VM name in field 540 of an entry 500 of IoT registered device DB 145. User device 100 may use a Web API or RESTful API for registering the single IoT device.

If more than a single IoT device is to be registered (NO—block 640), then app 115 receives device IDs, and label(s) for the multiple IoT devices (block 655). App 115 registers the multiple IoT devices in a batch mode, including the device IDs, label(s), and the selected/created virtual model (block 660). To register the multiple IoT devices in a batch mode, app 115 of device 100 may store the device IDs in field 520, the label(s) in field 530, and the VM name in field 540 of an entry 500 of IoT registered device DB 145. The payload of the batch registration may be in JavaScript Object Notation (JSON) format, and a RESTful API may be used for the batch registration. FIG. 7 depicts IoT VM app 115 sending a device ID(s) and label(s) 740 for registration to thingspace platform 105, and, in turn, thingspace platform 105 registering the IoT device(s) in IoT registered device DB 145.

Figure 10:
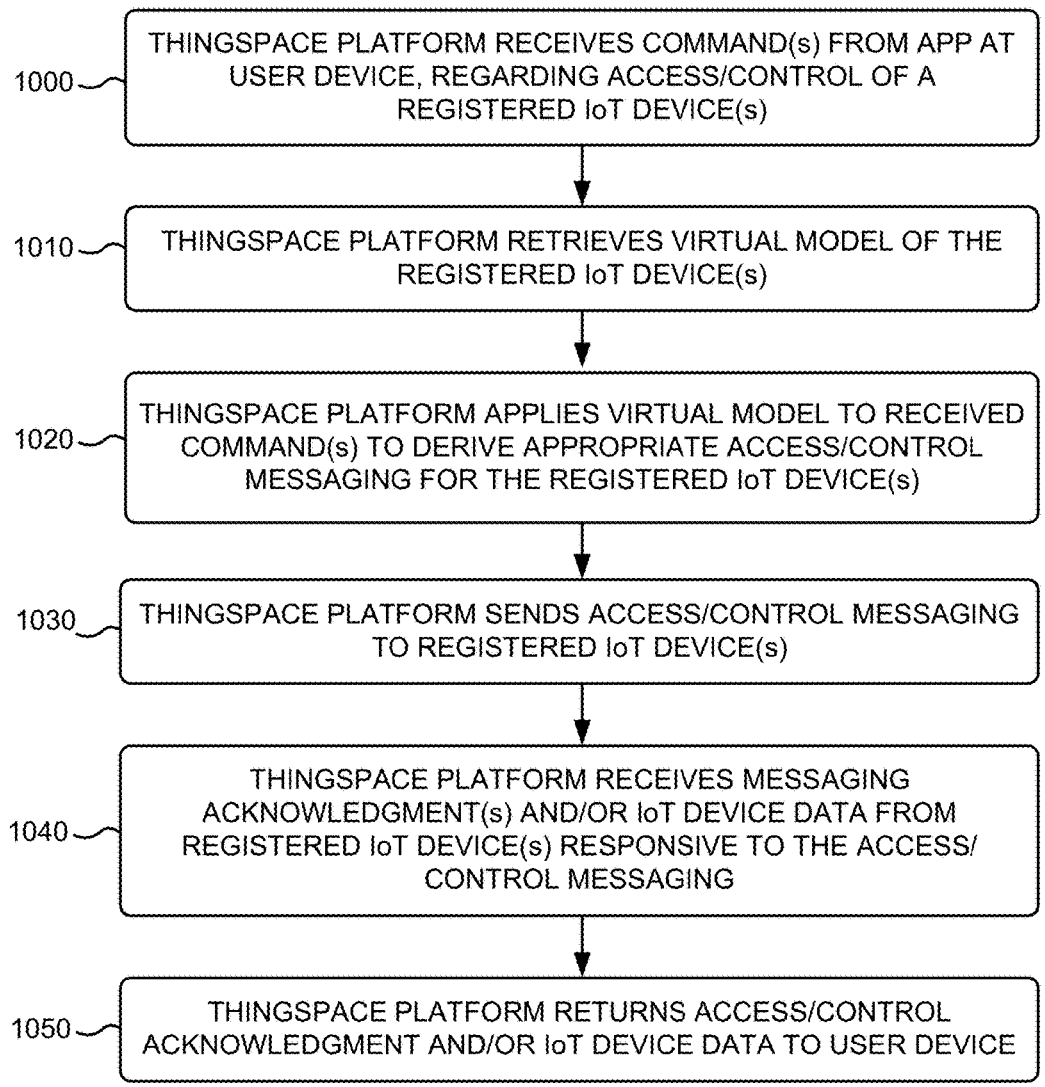
FIG. 10 is a flow diagram that illustrates an exemplary process for enabling the access to and/or control of a physical IoT device using a previously selected or created thing virtual model associated with the IoT device.

FIG. 10 is a flow diagram that illustrates an exemplary process for enabling the access to data of, and/or control of, a physical IoT device using a previously selected or created thing virtual model associated with the IoT device. The exemplary process of FIG. 10 may be implemented by thingspace platform 105, in conjunction with a user device 100.

Figure 11:
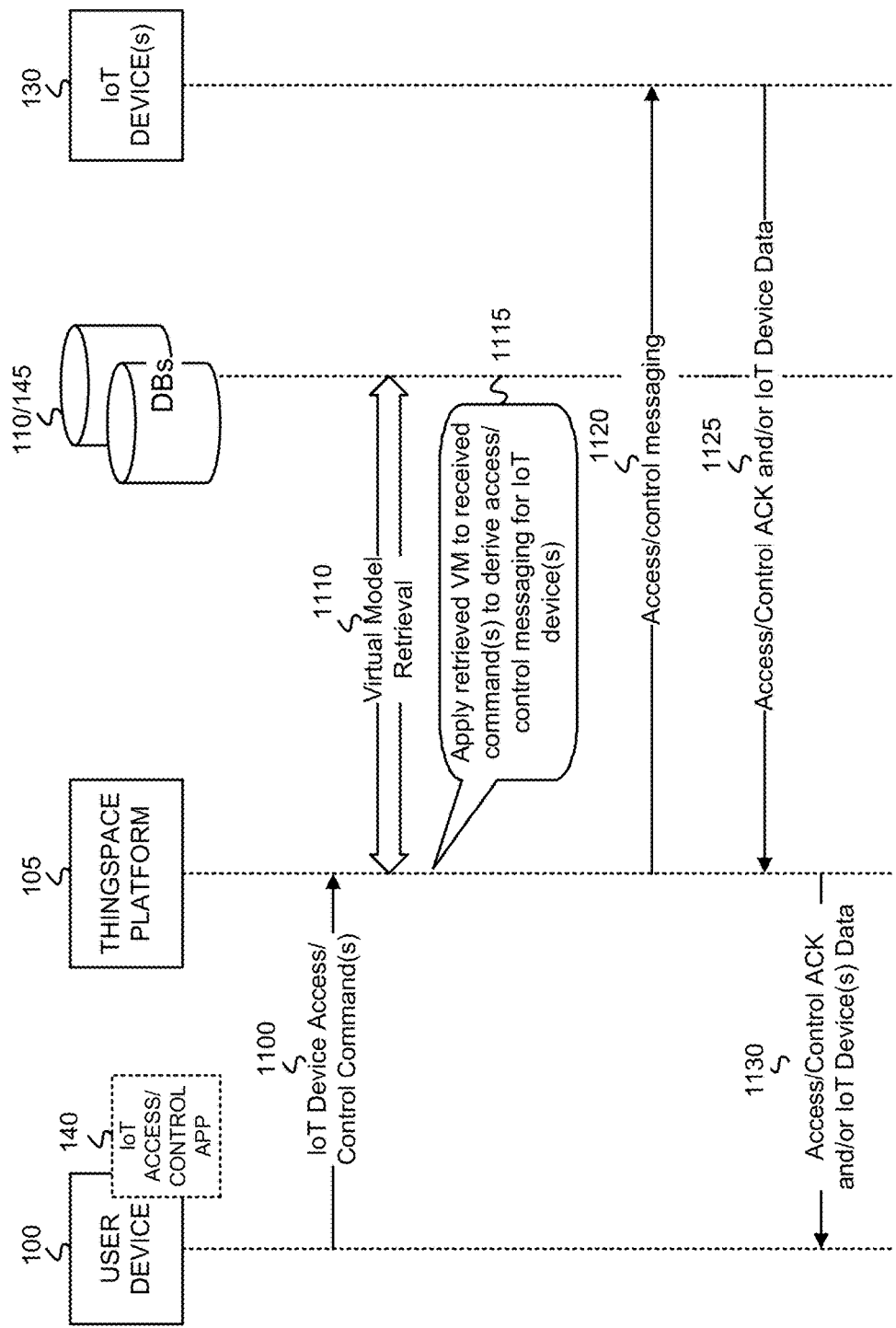
FIG. 11 is an exemplary messaging diagram associated with the process of FIG. 10.

The exemplary process includes thingspace platform 105 receiving a command(s) from IoT access/control app 140 at a user device 100, regarding access to data of, and/or control of, a registered IoT device(s) (block 1000). The user of user device 105 may enter/select, via a user interface of user device 105, a command(s) to access data at a particular selected IoT device(s) 130, or a command(s) to control the operation of a particular selected IoT device(s). The command(s) to access data at the particular selected IoT device(s) 130 may include a command to access measured or sensed data by a particular sensor of the IoT device(s) 130. The command(s) to control the operation of the particular selected IoT device(s) may include a command(s) to control a device state of the IoT device(s). The command(s) includes an identification of the particular IoT device(s) to which the command(s) is directed. In one implementation, the identification may include the network address of the particular IoT device(s). The messaging diagram of FIG. 11 depicts user IoT access/control app 140 of device 100 sending IoT device access/control command(s) 1100 to thingspace platform 105.

Figure 12:
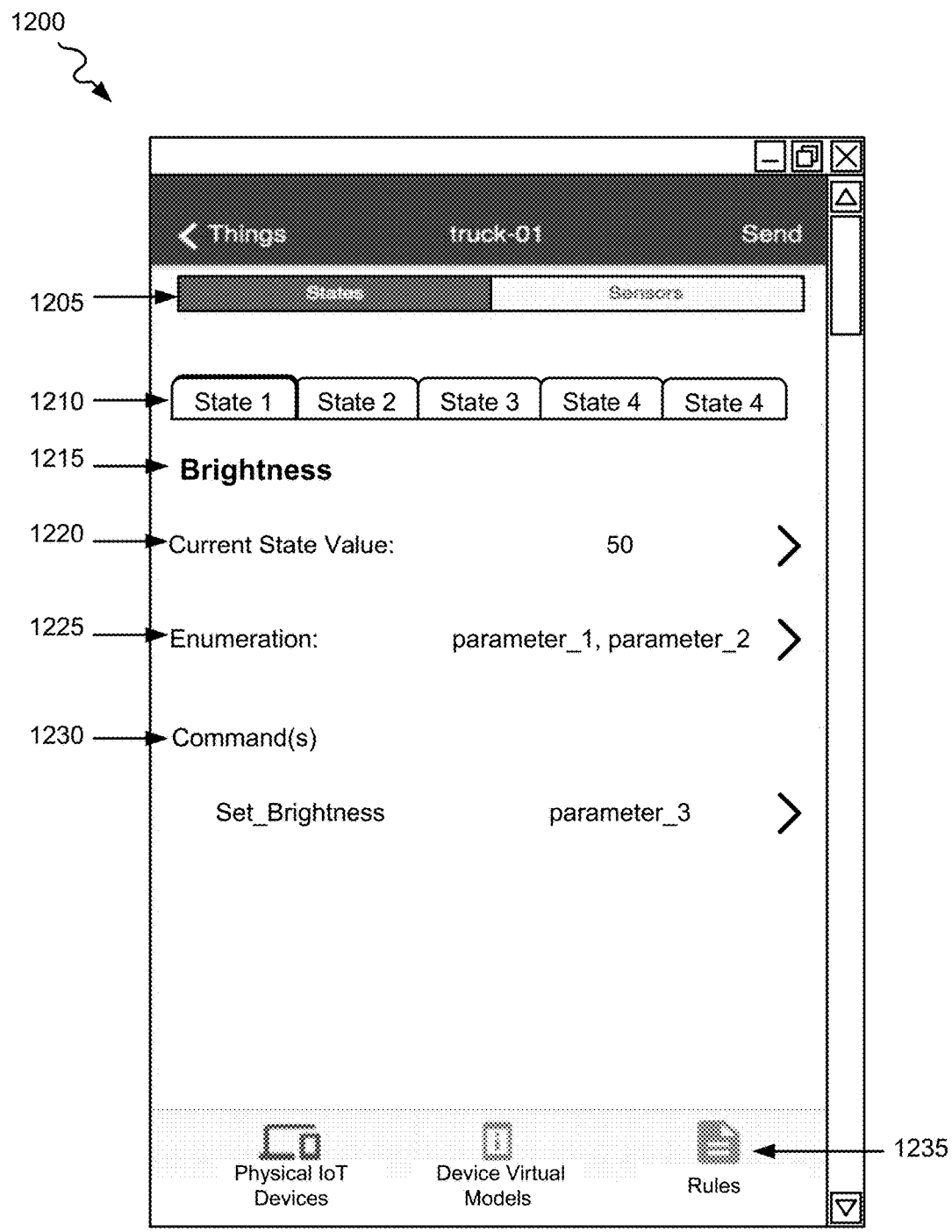
FIG. 12 is a diagram depicting an exemplary user interface that displays, and enables user access and/or control of one or more states associated with a thing virtual model of a particular physical IoT device(s)

FIG. 12 depicts an exemplary GUI 1300 that may be used at user device 100 for controlling one or more device states of one or more physical IoT devices. The user of user device 100 may, via the user interface, select a label that identifies one or more physical IoT devices (e.g., "truck-01" in this example), and may then select a "States" button 1205 from the GUI 1300. Upon selection of the "States" button 1205, one or more device states associated with the physical IoT device(s) corresponding to the selected label are displayed (e.g., "State 1," "State 2," "State 3," and "State 4" shown in FIG. 12). The user of user device 100 may select a tab 1210, from GUI 1200, corresponding to "State 1," to access and control the parameters of device "state 1." In this particular example, the device state is "brightness" 1215, with a current state value 1220 of "50%". As further shown in GUI 1200 under "State 1" tab 1210, the brightness device state has an enumeration 1225 that ranges from "parameter_1" to "parameter 2." For example, if parameter_1 equals 0%, and parameter_2 equals 100%, then the enumeration range for the brightness device state may range from 0% (low) to 100% (high). As also shown in GUI 1200 under "State 1" tab 1210, one or more commands 1230 may be associated with the particular device state for exercising control over the device state. In the example shown, the available command for controlling the "brightness" device state is "Set_Brightness" with a corresponding control argument "parameter_3." When the user of user device 100 selects the "Set_Brightness" command, and further enters an argument value within the enumeration range, user device 100 sends the command and argument value to thingspace platform 105 which, based on the VM for the particular IoT device, sends command instructions to the IoT device instructing the device to change its "brightness" device state to the user's argument value.

In addition to commands for controlling IoT devices, the user of user device 100 may specify rules by selecting "rules" button 1235 via GUI 1200. Selection of "rules" button 1235 enables the user to specify one or more conditional "If-Then" rules to control the operation of the particular IoT device(s). For example, one rule specified by the user could be "If the room temperature measurement is over 90 degrees Fahrenheit, then turn on the air conditioning in that room." Various different rules may be specified by the user related to controlling a single IoT device, or to controlling multiple different IoT devices.

Thingspace platform 105 retrieves a virtual model of the registered IoT device(s) (block 1010). Thingspace platform 105, upon extracting the identification of the particular IoT device(s) to which the command(s) is directed from the received command(s), may index IoT registered device DB 145 to locate an entry 500 having an ID(s) within IoT device ID(s) field 520 that matches the extracted identification. For example, if the extracted identification is a network address, thingspace platform 105 indexes DB 145 to locate an entry 500 having a network address in field 520 that matches the extracted network address. Upon locating an entry 500 with the matching network address, thingspace platform 105 retrieves the virtual model name from field 520 of the located entry 500.

Thingspace platform 105, upon retrieval of the virtual model name from DB 145, may index thing VM DB 110 to locate an entry 400 having a VM name in field 410 that matches the retrieved virtual model name. Upon locating an entry 400 with the matching VM name, thingspace platform 105 retrieves the thing VM attributes stored in field 420, as the virtual model corresponding to the VM name. FIG. 11 depicts thingspace platform 105 engaging in virtual model retrieval 1110 from DBs 110 and 145.

Thingspace platform 105 applies the virtual model to the received command(s) to derive appropriate access and/or control messaging for the registered IoT device(s) (block 1020). Thingspace platform 105 uses the VM's attributes, retrieved in block 1010), to derive appropriate data access and/or control messaging for sending to the IoT device(s). The messaging diagram of FIG. 11 depicts thingspace platform 105 applying 1115 the retrieved VM attributes to the received command(s) to derive the access/control messaging for the IoT device(s).

Thingspace platform 105 sends access and/or control messaging to the registered IoT device(s) (block 1030). FIG. 11 depicts thingspace platform 105 sending access/control messaging 1320 to one or more IoT device(s) 130 for which the user at user device 100 is accessing sensor/measurement data or device operational data, or controlling the operation of the IoT device(s) 130.

Thingspace platform 105 receives access/control acknowledgment(s) (ACK(s)) and/or IoT device data from the registered IoT device(s) responsive to the access and/or control messaging (block 1040). FIG. 11 depicts thingspace platform 105 receiving access/control ACK(s) and/or IoT device data 1125 from IoT device(s) 130. Thingspace platform 105 returns access/control acknowledgment(s) and/or the received IoT device(s) data to the user device 100 (block 1050). FIG. 11 depicts thingspace platform 105 forwarding 1130 access/control acknowledgments (ACKs) and/or IoT device(s) data received from IoT device(s) 130. FIG. 13 depicts an exemplary GUI 1300 for receiving and displaying sensor data from one or more physical IoT devices. Upon selection of the IoT physical device(s) associated with the label "truck-01," the user of user device 100 may select the "sensors" button 1305 from GUI 1300 to display the various sensor types associated with the IoT physical device(s), and the current sensed/measured values associated with those sensor types. For example, as shown in FIG. 13, an altitude sensor 1310, a latitude sensor 1315, a longitude sensor 1320, an "ontime" sensor 1325, and a temperature sensor 1330 are displayed in GUI 1300, along with current sensed/measured values received from the IoT physical device(s) via thingspace platform 105. For example, altitude sensor 1310 shows a current measured altitude of 50 kilometers, latitude sensor 1315 shows a current measured latitude of 69.4303049, longitude sensor 1320 shows a current measured longitude of −52.1703861, the "ontime" sensor 1325 shows a value of "none," and the temperature sensor 1330 shows a current measured temperature of 12 degrees Fahrenheit. The exemplary process of FIG. 10 may be repeated for each received command(s) regarding access/control of a registered IoT device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B and 10, and message flows with respect to FIGS. 7 and 11, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A platform, comprising:
a communication interface connected to a network;
at least one processor; and
memory storing computer instructions that, when executed by the at least one processor, cause the at least one processor to:
  enable, via the communication interface, browsing of a plurality of pre-defined virtual models (VMs) associated with Internet of Thing (IoT) devices,
  receive, from a user device via the communication interface, selection of a first pre-defined VM from the plurality of pre-defined VMs, wherein the first pre-defined VM comprises at least one first device state and at least one first sensor type,
  receive, from the user device via the communication interface, instructions to modify the first pre-defined VM, by adding an additional device state or an additional sensor type to the first pre-defined VM or by removing the at least one first device state or the at least one first sensor type from the first pre-defined VM, to create a first customized VM associated with a first physical IoT device,
  store, via the communication interface, the first customized VM in a database that already stores the plurality of pre-defined VMs, and
  use the first customized VM for accessing or controlling the first physical IoT device.

2. The platform of claim 1, wherein the computer instructions that cause the at least one processor to enable browsing of the plurality of pre-defined VMs further comprise instructions that cause the at least one processor to:
provide, to the user device via the communication interface, a catalog that includes the plurality of pre-defined VMs, and
receive, from the user device via the communication interface, the selection of the first pre-defined VM of the plurality of pre-defined VMs from the provided catalog.

3. The platform of claim 1, wherein the computer instructions further comprise computer instructions that cause the at least one processor to:
provide, to the user device via the communication interface, a catalog that includes a plurality of pre-defined states and a plurality of pre-defined sensor types, wherein the plurality of pre-defined states includes the additional state and wherein the plurality of pre-defined sensor types includes the additional sensor type, and
receive, from the user device via the communication interface, selection of the additional state or the additional sensor type from the provided catalog.

4. The platform of claim 1, wherein the computer instructions that cause the at least one processor to use the first customized VM for accessing or controlling the first physical IoT device further comprise computer instructions that cause the at least one processor to:
access, via the communication interface from the first physical IoT device, data generated by a sensor associated with the at least first sensor type, or data associated with the at least one first device state.

5. The platform of claim 1, wherein the computer instructions that cause the at least one processor to use the first customized VM for accessing or controlling the first physical IoT device further comprise computer instructions that cause the at least one processor to:

send control signaling, via the communication interface to the first physical IoT device, to control the at least one first device state, or operation of a sensor associated with the at least first sensor type.

6. The platform of claim 1, wherein the plurality of pre-defined VMs each include at least one pre-defined device state or at least one pre-defined sensor type.

7. The platform of claim 1, wherein the at least one first device state of the first pre-defined VM comprises a plurality of first device states, and wherein the at least one first sensor type comprises a plurality of first sensor types.

8. A non-transitory storage medium storing instructions executable by a computational device, wherein the instructions comprise instructions to cause the computational device to:

provide a virtual model (VM) browser to a user device, wherein the VM browser enables browsing of a plurality of pre-defined device states and a plurality of pre-defined sensor types associated with VMs of Internet of Thing (IoT) devices, receive, from the user device via the VM browser, selection of at least one pre-defined device state from the plurality of pre-defined device states or at least one pre-defined sensor type from the plurality of pre-defined sensor types to create a first customized VM associated with a first physical IoT device, cause the first customized VM to be stored in a database that already stores the plurality of pre-defined device states and the plurality of pre-defined sensor types, and use the first customized VM to provide access to, or control over, the first physical IoT device.

9. The non-transitory storage medium of claim 8, wherein the first customized VM provides generalized software mechanisms, associated with the at least one pre-defined device state or the at least one pre-defined sensor type, for accessing and controlling the first physical IoT device.

10. The non-transitory storage medium of claim 8, wherein, when receiving the selection of the at least one pre-defined device state or the at least one pre-defined sensor type, the instructions comprise instructions to cause the computational device to:

receive, from the user device via the VM browser, selection of a plurality of first pre-defined device states to create the first customized VM associated with the first physical IoT device, or receive, from the user device via the VM browser, selection of a plurality of first pre-defined sensor types to create the first customized VM associated with a first physical IoT device.

11. The non-transitory storage medium of claim 8, wherein, when receiving the selection of the at least one pre-defined device state or the at least one pre-defined sensor type, the instructions comprise instructions to cause the computational device to:

receive, from the user device via the VM browser, selection of a plurality of first pre-defined device states, receive, from the user device via the VM browser, selection of a plurality of first pre-defined sensor types, and create the first customized VM associated with the first physical IoT device based on the selected plurality of first pre-defined device states and the plurality of first pre-defined sensor types.

12. The non-transitory storage medium of claim 8, wherein the instructions comprise instructions to cause the computational device to:

retrieve, from the database, one or more Application Programming Interfaces (APIs), associated with the at least pre-defined device state or the at least one pre-defined sensor type, and wherein, when using the first customized VM to provide access to, or control over, the first physical IoT device, the instructions comprise instructions to cause the computational device to:

use the one or more APIs to provide the access to, or the control over, the first physical IoT device.

13. The non-transitory storage medium of claim 8, wherein, when using the first customized VM to provide access to, or control over, the first physical IoT device, the instructions further comprise instructions to cause the computational device to:

access, from the first physical IoT device, data generated by a sensor associated with the at least one pre-defined sensor type, or data associated with the at least one pre-defined first device state, or send control signaling to the first physical IoT device, to control the at least one pre-defined first device state, or operation of a sensor associated with the at least one pre-defined first sensor type.

14. A method comprising:

providing, by a network device, a virtual model (VM) browser to a user device, wherein the VM browser enables browsing of a plurality of pre-defined device states and a plurality of pre-defined sensor types associated with VMs of Internet of Thing (IoT) devices;

receiving, at the network device and from the user device via the VM browser, selection of at least one pre-defined device state from the plurality of pre-defined device states or at least one pre-defined sensor type from the plurality of pre-defined sensor types to create a first customized VM associated with a first physical IoT device;

causing, by the network device, the first customized VM to be stored in a database that already stores the plurality of pre-defined device states and the plurality of pre-defined sensor types; and using, by the network device, the first customized VM to provide access to, or control over, the first physical IoT device.

15. The method of claim 14, wherein the first customized VM provides generalized software mechanisms, associated with the at least one pre-defined device state or the at least one pre-defined sensor type, for accessing and controlling the first physical IoT device.

16. The method of claim 14, wherein receiving the selection of the at least one pre-defined device state or the at least one pre-defined sensor type comprises:

receiving, from the user device via the VM browser, selection of a plurality of first pre-defined device states to create the first customized VM associated with the first physical IoT device, or receiving, from the user device via the VM browser, selection of a plurality of first pre-defined sensor types to create the first customized VM associated with the first physical IoT device.

17. The method of claim 14, wherein receiving the selection of the at least one pre-defined device state or the at least one pre-defined sensor type comprises:

receiving, from the user device via the VM browser, selection of a plurality of first pre-defined device states;

receiving, from the user device via the VM browser, selection of a plurality of first pre-defined sensor types; and creating the first customized VM associated with the first physical IoT device based on the selected plurality of first pre-defined device states and the plurality of first pre-defined sensor types.

18. The method of claim 14, further comprising:

retrieving, from the database, one or more Application Programming Interfaces (APIs), associated with the at least pre-defined device state or the at least one pre-defined sensor type; and wherein using the first customized VM to provide access to, or control over, the first physical IoT device further comprises:

using the one or more APIs to provide the access to, or the control over, the first physical IoT device.

19. The method of claim 14, wherein using the first customized VM to provide access to, or control over, the first physical IoT device further comprises:

accessing, from the first physical IoT device, data generated by a sensor associated with the at least one pre-defined sensor type, or data associated with the at least one pre-defined first device state, or sending control signaling to the first physical IoT device, to control the at least one pre-defined first device state, or operation of a sensor associated with the at least one pre-defined first sensor type.

20. The method of claim 14, wherein the at least one pre-defined device state includes a multiple of pre-defined devices states and wherein the at least one pre-defined sensor type includes a multiple of pre-defined sensor types.

\* \* \* \* \*